United States Patent
Waller et al.

(10) Patent No.: US 8,432,553 B2
(45) Date of Patent: Apr. 30, 2013

(54) PHASE FROM DEFOCUSED COLOR IMAGES

(75) Inventors: Laura A. Waller, Hopewell, NJ (US); George Barbastathis, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 218 days.

(21) Appl. No.: 12/898,830

(22) Filed: Oct. 6, 2010

(65) Prior Publication Data

US 2011/0085173 A1  Apr. 14, 2011

Related U.S. Application Data

(60) Provisional application No. 61/278,765, filed on Oct. 8, 2009.

(51) Int. Cl.
*G01B 9/02* (2006.01)
*G01B 11/02* (2006.01)

(52) U.S. Cl.
USPC ........... 356/484; 356/485; 356/496; 356/497; 356/498; 356/511

(58) Field of Classification Search ................... 356/489, 356/512–515, 520, 521, 600, 601, 612; 702/66–74; *G01J 9/00, 9/04*
See application file for complete search history.

(56) References Cited

U.S. PATENT DOCUMENTS

| 7,414,722 B2 * | 8/2008 | Van Bilsen ..................... 356/401 |
| 2005/0007603 A1 * | 1/2005 | Arieli et al. .................... 356/601 |
| 2006/0175528 A1 * | 8/2006 | Greenaway et al. ....... 250/201.9 |
| 2008/0013090 A1 * | 1/2008 | Hagiwara ..................... 356/400 |

FOREIGN PATENT DOCUMENTS

| AU | 766 636 B2 | 10/2003 |
| WO | WO 99/13290 A1 | 3/1999 |

OTHER PUBLICATIONS

H. Kirchauer. Photolithography Simulation. Dissertation, Mar. 1998, Section 4.1.2.*
Notification of Transmittal of The International Search Report and The Written Opinion of The International Searching Authority, or The Declaration, dated Dec. 23, 2010, International Application No. PCT/US2010/051606.
Kato, J. and Yamaguchi, I., "Multicolor digital holography with an achromatic phase shifter," *Optics Letters*, 27(16): 1403-1405 (Aug. 15, 2002).

(Continued)

*Primary Examiner* — Gregory J Toatley
*Assistant Examiner* — Hina F Ayub
(74) *Attorney, Agent, or Firm* — Foley & Lardner LLP

(57) ABSTRACT

Phase differences associated with a defocused wavefront can be determined from a single color image. The color image, which is a measurement of intensity as a function of wavelength, is used to calculate the change in intensity with respect to wavelength over the image plane. The change in intensity can then be used to estimate a phase difference associated with the defocused wavefront using two-dimensional fast Fourier transform solvers. The phase difference can be used to infer information about objects in the path of the defocused wavefront. For example, it can be used to determine an object's shape, surface profile, or refractive index profile. It can also be used to calculate path length differences for actuating adaptive optical systems. Compared to other techniques, deriving phase from defocused color images is faster, simpler, and can be implemented using standard color filters.

40 Claims, 8 Drawing Sheets

OTHER PUBLICATIONS

Gureyev, T.E. and Wilkins, S.W., "On X-ray phase retrieval from polychromatic images," *Optic Communications*, 147: 229-232 (Feb. 15, 1998).

Allen, L.J. and Oxley, M.P., "Phase retrieval from series of images obtained by defocus variation," *Optic Communcations*, 199: 65-75 (Nov. 15, 2001).

Barone-Nugent, E.D. et al., "Quantitative Phase-Amplitude Microscopy I: Optical Microscopy," *Journal of Microscopy*, 206(3): 194-203 (Jun. 2002).

Barty, A. et al., "Quantitative Phase Tomography," *Optics Communications*, 175: 329-336 (Mar. 1, 2000).

Beleggia, M. et al., "On the Transport of Intensity Technique for Phase Retrieval," *Ultramicroscopy*, 102: 37-49 (2004).

Gureyev, T.E. et al., "Quantitative In-Line Phase-Contrast Imaging with Multienergy X Rays," *Physical Review Letters*, 86(25): 5827-5830 (Jun. 18, 2001).

Loomis, N. et al., "High-Speed Phase Recovery Using Chromatic Transport of Intensity Computation in Graphics Processing Units," Digital Holography and Three-Dimensional Imaging, OSA Technical Digest (CD) (Optical Society of America, Apr. 11, 2010), paper JMA7.

Nugent, K.A. et al., "Quantitative Phase Imaging Using Hard X Rays," *Physical Review Letters*, 77(14): 2961-2964 (Sep. 30, 1996).

Teague, M.R., "Deterministic Phase Retrieval: A Green's Functional Solution," *J. Opt. Soc. Am.*, 73(11): 1434-1441 (Nov. 1983).

Waller, L. et al., "Phase from Chromatic Aberrations," *Optics Express*, 18(22): 22817-22825 (Oct. 13, 2010).

\* cited by examiner

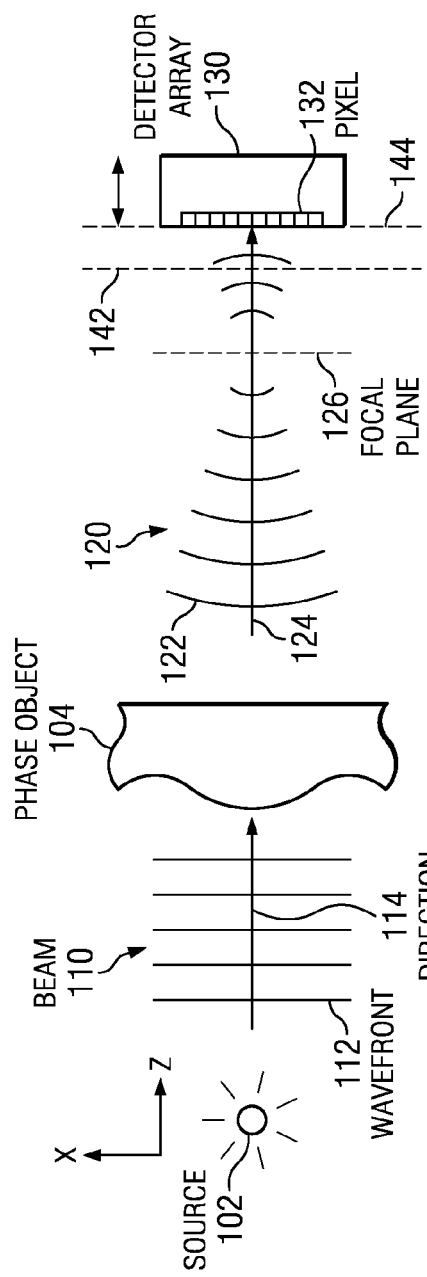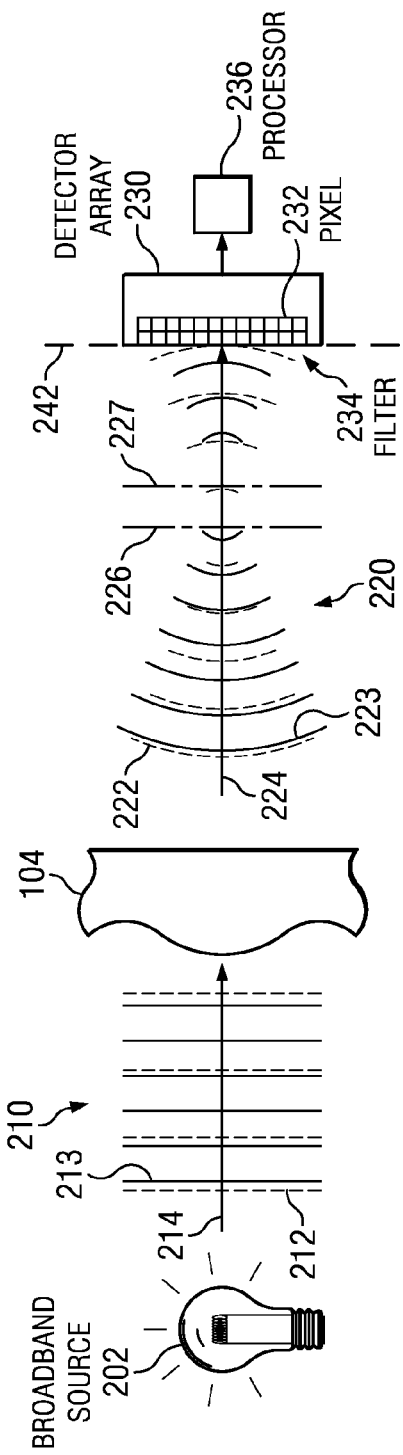

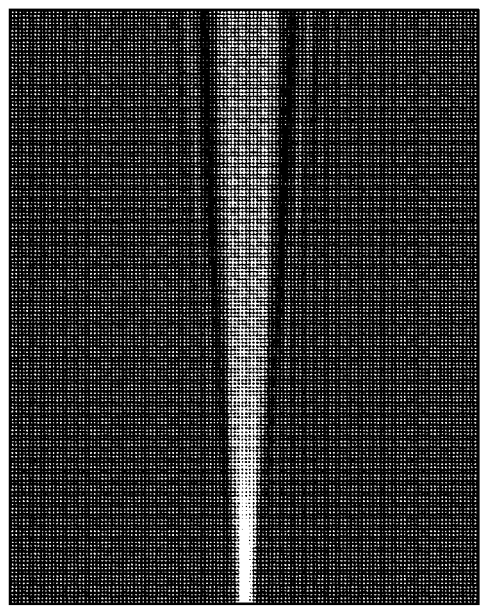
FIG. 4A
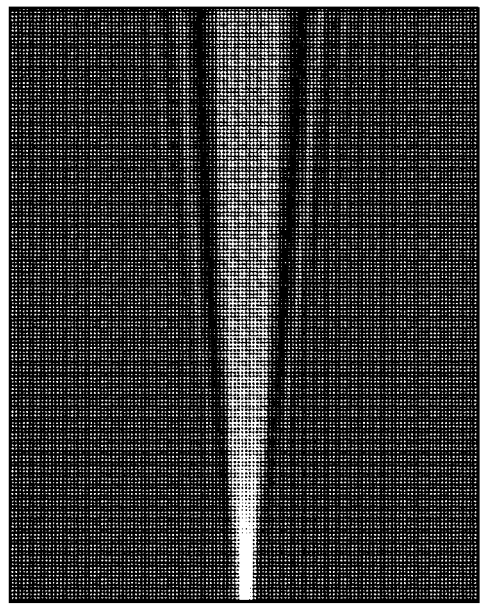
FIG. 4B
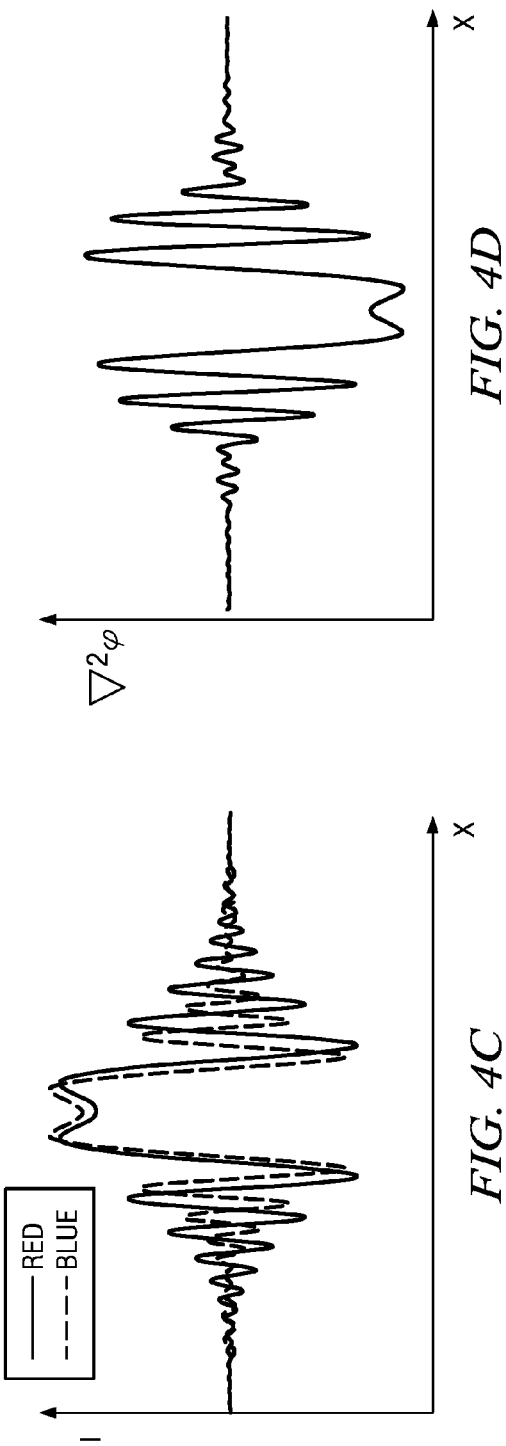
FIG. 4C
FIG. 4D

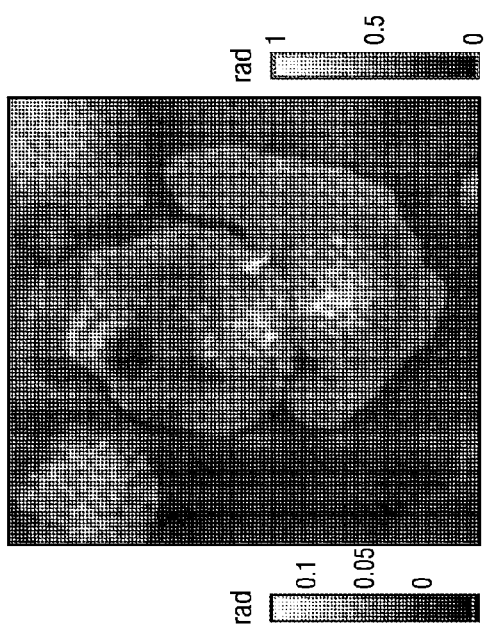
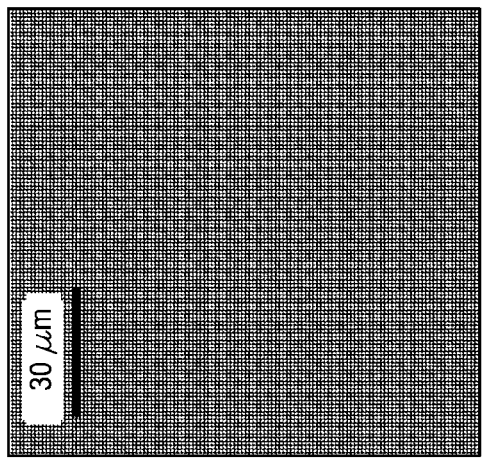
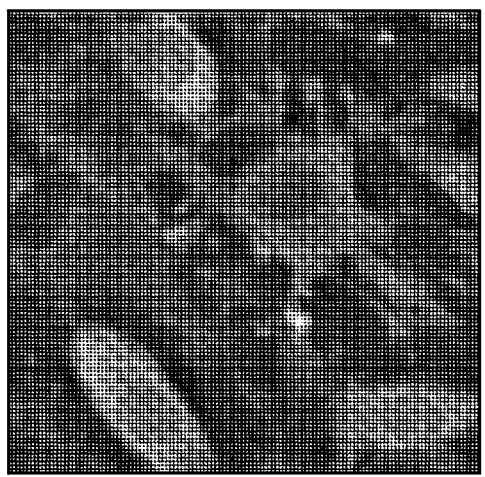
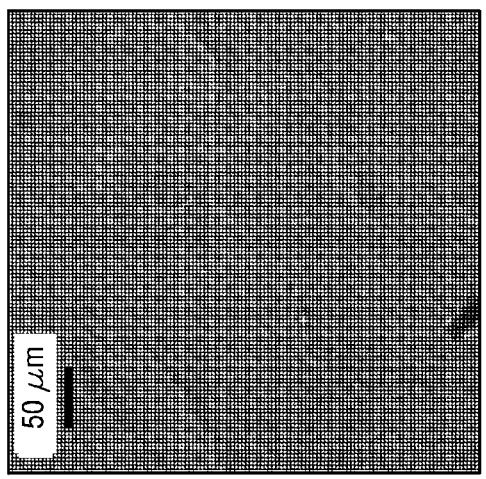
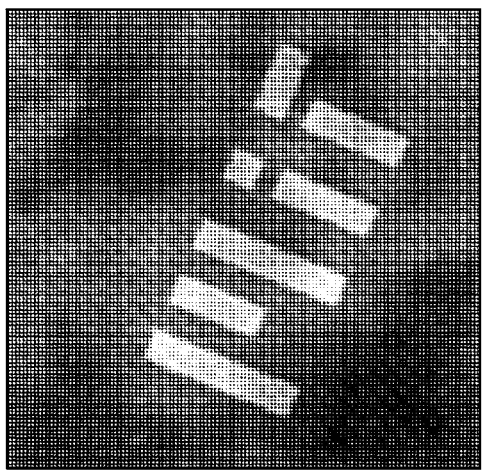
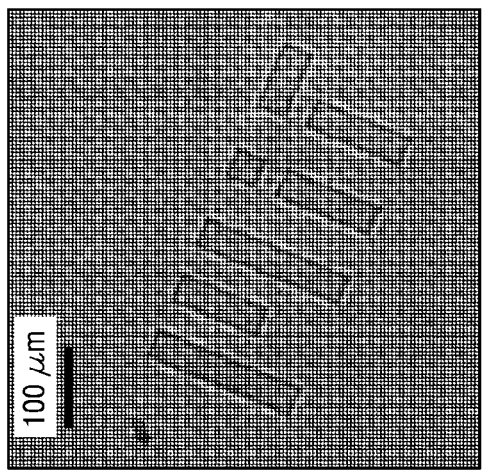
FIG. 7C  FIG. 7B  FIG. 7A
COLOR IMAGE
RECOVERED PHASE

PHASE FROM DEFOCUSED COLOR IMAGES

RELATED APPLICATION

This application claims the benefit of U.S. Provisional Application No. 61/278,765, filed on Oct. 8, 2009, the entire teachings of which are incorporated herein by reference.

BACKGROUND OF THE INVENTION

Light can be characterized as a wave having frequency, amplitude, and phase. Because these waves oscillate too quickly to be detected directly, we can only detect their intensity, not their phase. Phase, however, carries information about an object's optical density and thickness. Transparent objects, for example, do not change the amplitude of the light passing through them, but introduce phase delays due to regions of higher optical density (refractive index). Optical density is related to physical density, and thus phase imaging can give distributions of pressure, temperature, humidity, and other material properties. The phase of reflected waves can also be used to derive information about the topology, or surface profile, of the object from which the waves were reflected.

In phase contrast imaging, a lens separates the dc component of light transmitted through a transparent or translucent object from components at higher spatial frequencies. A phase mask shifts the phase of the dc component with respect to components of the wavefront at higher spatial frequencies. Fourier transforming the wavefront causes the phase-shifted dc component to interfere with the higher-frequency components, resulting in an image whose contrast depends on the object's optical density. Although phase-contrast imaging is relatively simple, it provides only qualitative information about the optical density of the object being imaged.

Most quantitative phase imaging methods involve interferometry, which usually requires coherent illumination and stable reference beams. For example, interferometry can be used to produce a fringe pattern whose period depends on the slope of a surface relative to a reference plane. Unfortunately, producing the fringe pattern requires illuminating the surface with coherent light and stabilizing the path lengths of the reference and object beams to within a fraction of the illumination wavelength. The fringe pattern must also be unwrapped, which is difficult to do for two-dimensional fringe patterns or phase profiles with steep phase gradients or significant noise.

Noninterferometric phase measurement techniques are better-suited for use in adaptive optical systems because they do not need stabilized reference beams. For example, a Shack-Hartmann sensor measures wavefront error (phase difference) by transforming spatial phase variations in an incident wavefront into spatial displacements. A lenslet array transforms the wavefront into an array of spots, where the transverse position of each spot depends on the phase of the portion of the wavefront sampled by the corresponding lenslet. Unfortunately, Shack-Hartmann sensors tend to have poor spatial resolution because the number of lenslets in the lenslet array must be several times smaller than the number of pixels used to detect the shifted spots.

The Transport of Intensity Equation (TIE) is a wave-optical phase retrieval technique that involves measuring the derivative of intensity along the optical axis by taking images at varying depths, then solving for the phase. Typically, the TIE approach uses three images: an in-focus image, an under-focused image, and an over-focused image, where the under- and over-focused images are symmetric about the in-focus image. The out-of-focus images are used to estimate the derivative of the intensity in the direction of propagation, which, in turn, can be used to solve the TIE for the phase, provided that the out-of-focus images are within the small defocus limit. For more on the TIE approach, see M. Beleggia et al., "On the transport of intensity technique for phase retrieval," Ultramicroscopy 102:37-49 (2004), incorporated herein by reference in its entirety. Although TIE does not require a reference beam, it does require a mechanically stable platform and multiple sequential measurements, so it is not suitable for use in real-time measurement or feedback loops, such as those used in adaptive optical systems.

SUMMARY OF THE INVENTION

Phase differences associated with a defocused wavefront can be determined by measuring the intensity of the defocused wavefront at first and second wavelengths with a detector array. The intensity measurements are used to calculate a change in the measured intensity as a function of wavelength, which, in turn, is used to estimate the phase difference. The phase difference can then be used to infer information about objects in the path of the defocused wavefront. For example, the phase difference can be used to determine an object's shape, surface profile, or refractive index profile, as described below.

Typically, the detector array is on a plane normal to the mean direction of propagation of the defocused wavefront. The measurement plane is usually within the small defocus limit, which is characterized by a Fresnel number greater than or equal to one. Measurements at additional wavelengths may be used to improve the precision of the measurement.

Measurements may be made in transmission or reflection using broadband, partially coherent light or illumination at two or more wavelengths. Either simultaneous or sequential measurements are possible. For example, cameras with Bayer filters on complementary metal-oxide-semiconductor detector arrays or charge-coupled device arrays filter, then detect intensity at wavelengths corresponding to red, green, and blue simultaneously. Data captured with Bayer filters can be used to more accurately compute the change in intensity with respect to wavelength, possibly by calculating second-order derivatives without increasing noise. Alternatively, direct image sensors, which do not need filters, can be used to detect red, green, and blue light simultaneously at each and every detector element in the sensor.

Certain arrangements may be used to estimate refractive index profiles or perform surface topology measurements. Others may be used to estimate and adjust path length differences based on estimate phase differences. For instance, example sensors can be used with feedback loops, such as those used in adaptive optical systems to compensate for environmental perturbations (e.g., temperature and pressure changes). Phase measurements can also be used to adjust imaging system; for example, if the chromatic dispersion of the imaging system is known a priori, then the phase measurement can be used to adjust the defocus at each wavelength propagating through the system.

The technique may also be used to process data captured with existing cameras and microscopes, including cameras and microscopes that exhibit chromatic aberrations. For example, a computer program can be used to estimate the phase of wavefronts from color images detected by an off-the-shelf digital camera. In this case, the camera acquires color image data, which is then loaded into computer memory. The program calculates the change in the measured intensity as a function of wavelength using the color image data, then estimates the phase based on the change in the measured intensity. The program then outputs an indication of the phase to a user. Example indications include plots of the estimated phase, path length, refractive index profile, and surface profile. Alternatively, the program output can feed into an adaptive processor for actuating an optical path length in response to the estimated phase.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a diagram illustrating transmission-mode phase measurements using techniques based on the Transport of Intensity Equation.

FIG. 2 is a diagram illustrating transmission-mode phase measurements made by measuring intensity as a function of wavelength.

FIGS. 4A and 4B are two-dimensional plots of simulations of, respectively, blue and red propagating waves.

FIG. 4C is a plot of the simulated defocused intensity for the blue and red waves show in FIGS. 4A and 4B, respectively.

FIG. 4D is a plot of the Laplacian of the phase given by the difference in defocused intensities show in FIG. 4C.

FIGS. 7A, 7B, and 7C show defocused color images (top row; reproduced here as grayscale images) and two-dimensional plots of recovered phase (bottom row) for a test object, live HMVEC cells, and live HeLa cells, respectively.

DETAILED DESCRIPTION OF THE INVENTION

Figure 3:
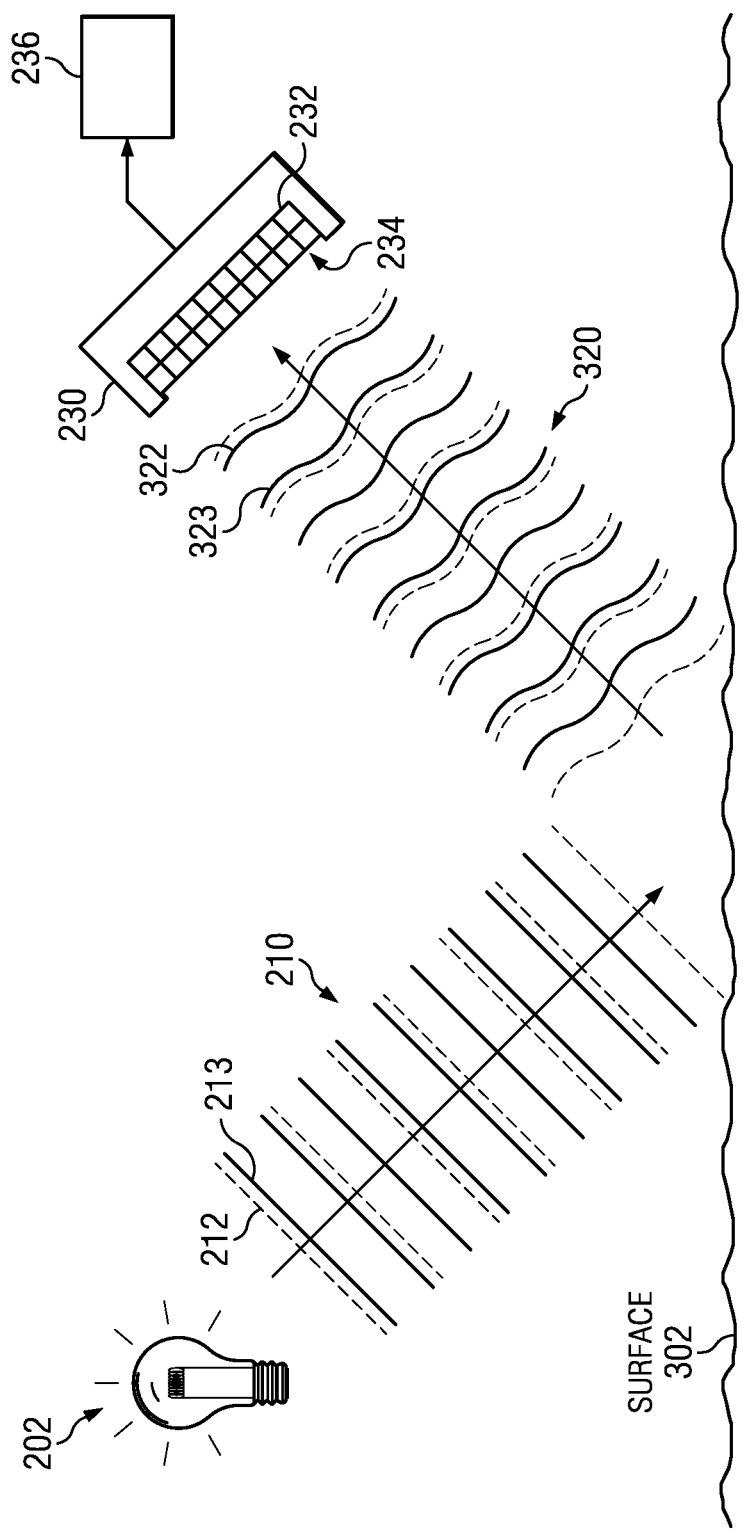
FIG. 3 is a diagram illustrating reflection-mode phase measurements made by measuring intensity as a function of wavelength.

A description of example embodiments of the invention follows.

The phase of a defocused wavefront can be determined by measuring the intensity of a color image at just one plane, provided that different colors incur different amounts of defocus aberration. Separating the color image into different color channels yields intensity maps at the measurement plane for each color. Differentiating the intensity with respect to wavelength and distance yields a derivative that can be used to solve for the phase of the wavefront. The phase, in turn, yields information about the location and optical thickness of objects in the wavefront's path that can be used to improve the resolution of the image represented by the measured wavefront and/or to control adaptive optical systems.

Unlike interferometric techniques, the phase measurements based on defocused color images do not need coherent illumination or reference beams. Every detector pixel captures information, so the resolution is much better than that of Shack-Hartmann sensors with the same number of pixels. In addition, because phase can be derived from just one image, measurement time is short compared to the extended measurement times required for sequential image capture, as in TIE techniques. As a result, phase measurements based on defocused color images can be used in adaptive optics (e.g., in astronomy and microscopy); passive ranging; nondestructive testing; shape measurements; and density measurements (e.g., measurement of gas pressure or temperature).

FIG. 1 is a diagram illustrating phase measurements made using the Transport of Intensity Equation (TIE) technique described above. A partially coherent source 102, such as a light-emitting diode, emits a beam 110 that illuminates a phase object 104, such as a piece of glass, to produce a transmitted beam 120. The incident beam 110 can be characterized by wavefronts 112 (shown here as planar wavefronts 112) propagating in a direction 114 roughly normal to the phase object 104. Each wavefront 112 is separated from its neighbors by a distance equal to the wavelength of the source 102.

The phase of the transmitted beam 120 evolves as the beam 120 propagates, causing wavefronts 122 associated with the beam 120 to evolve, or change in shape as they travel away from the phase object 104. In this example, the phase object 104 is slightly curved on one side and planar on the other, so the transmitted beam 120 comes into focus at a focal plane 126. As the beam 120 comes into and out of focus, each wavefront's radius of curvature changes in a way that depends, in part, on the shape of the phase object 104.

In TIE-based techniques, a detector array 130 is used to make measurements of the transmitted beam's intensity at two different measurement planes 142 and 144 that are roughly normal to the transmitted beam's direction of propagation 124. As shown in FIG. 1, the measurement planes 142 and 144 are within the small defocus limit, described in greater detail below. Pixels 132 in the detector array 130 acquire intensity data at points in each plane 142 and 144. The intensity at each plane 142 and 144 varies as a function of the phase, so the intensity measurements can be used to compute changes in the phase of the transmitted beam 120. The changes in phase can then be used to determine information about the phase object 104. For example, if the phase object 104 has a uniform refractive index, then the changes in phase can be used to determine the phase object's shape. If the phase object 104 has known shape, then the changes in phase can be used to determine the phase object's refractive index profile.

Unfortunately, moving the detector array 130 between the measurement planes 142 and 144 is time-consuming and difficult. To keep the array 130 aligned to within a fraction of a wavelength (e.g., 550 nm), the array 130 must be mounted on a bulky high-precision translation stage that may take milliseconds or more to move. The bulk, power requirements, and slow movement time of translation stages make TIE-based techniques unsuitable for real-time measurements.

FIG. 2 illustrates phase measurements made using a single defocused color image. In this case, a broadband, or white light source 202 emits a beam 210 that illuminates the phase object 104 described above. Because the beam 210 comes from a broadband source 202, it includes light at many different colors, or wavelengths. For instance, red light has a wavelength of about 650 nm; whereas blue light has a wavelength of about 465 nm. Each color corresponds to a respective set of wavefronts in the emitted beam 210. In FIG. 2, wavefronts 212 corresponding to red light are separated from each other by 650 nm and wavefronts 213 corresponding to blue light are separated from each other by 465 nm. The phase object 104 focuses the incident beam 210 to produce a transmitted beam 220 with wavefronts 222 and 223. As above, the phase of the transmitted beam 220 evolves, causing the red and blue wavefronts 222 and 223 to come into focus. In this case, however, dispersion in the phase object 104 causes the wavefronts 222 and 223 to evolve at different rates, so the red and blue components of the beam 220 come into focus at different planes 226 and 227.

A color detector array 230 measures the intensity of the transmitted beam 220 at a measurement plane 242 within the small defocus limit, where the array 230 is roughly normal to the beam's mean direction of propagation 224. The detector array 230 includes a color filter 234 disposed over two or more pixels 232, which may be part of a complementary metal-oxide-semiconductor or charge-coupled device array. The filter 234, which may be a Bayer filter (described below), prevents certain colors from being detected at certain pixels 232, so each pixel 232 detects intensity corresponding to only one color (e.g., red, green, or blue). The intensity values from the "red" pixels 232 form a red intensity map, which is combined with the blue and green intensity maps to form a full-color image. (Alternatively, the array 230 may be a direct image sensor that detects red, green, and blue light at each pixel, also described below.)

Once the array 230 acquires the defocused color image, a processor 236 coupled to the array 230 computes the change in intensity with respect to wavelength by subtracting the red intensity map from the blue intensity map (or vice versa) and dividing the result by the difference in defocus (wavelength times distance). The result can be used to estimate phase differences associated with the defocused wavefronts 222 and 223; the phase differences can be used to calculate the shape, refractive index profile, etc., of the phase object 104.

FIG. 3 shows how phase measurements can also be made by illuminating a surface with white light and measuring the intensity of a reflected beam 320. A white-light source 202 illuminates a surface 302, which reflects the incident beam 210. The phase evolution of the reflected beam 320 causes wavefronts 322 and 323 at different colors to evolve at different rates. A color detector array 230 arranged approximately normal to the reflected beam's mean direction of propagation 320 acquires a color image, and a processor 236 coupled to the array 230 estimates the phase variation by computing the change in intensity with wavelength.

Assuming that the illuminating beam propagates through homogeneous media (i.e., the refractive index is constant), the phase variation gives the distance to the illuminated surface. In microscopy and nondestructive testing, this can be used to more accurately determine an object's surface roughness, find cracks or fissures, or measure variations in surface height.

Theoretical Basis for Color-Based Phase Measurements

The phase measurement technique presented here exploits a derivation of the Fresnel transfer function that yields an expression for the variation in intensity due to differences in wavelength $\lambda$. Solving this expression makes it possible to estimate spatial phase variation based on information acquired from a single defocused image. To derive the expression for variation in intensity with respect to wavelength, start with an object wave $\psi_0(x) = a(x)\exp[i\phi(x)]$ where x is the transverse coordinate, a(x) is the amplitude, and $\phi(x)$ is the phase. As the wave propagates, it diffracts in a way that can be described using the Fresnel transform operator, $$h(x;\lambda) = \frac{1}{i\lambda z}\exp\left[ik\left(z + \frac{x^2}{2z}\right)\right], \quad (1)$$

where $k=2\pi/\lambda$. In the small defocus limit (described below), the transform operator can be approximated to first order, making it possible to write the intensity I of the diffracted object wave as $$I(x) = \left|\psi_0(x) + i\lambda z \frac{\nabla^2 \psi_0(x)}{4\pi}\right|^2, \quad (2)$$

where $\nabla$ is the gradient in the lateral direction, x. Taking the derivative of the intensity with respect to wavelength-dependent defocus yields an equation analogous to the Transport of Intensity Equation (TIE):

$$\frac{\partial I(x)}{\partial \xi} = \frac{-\nabla \cdot [I(x)\nabla\varphi(x)]}{2\pi} \quad (3)$$

where $\xi=\lambda z$ is the wavelength-dependent defocus. Unlike the TIE, however, the above equation can be used to solve for the phase, $\phi$, using intensity data acquired in a single plane (i.e., at a defocus distance z).

Once the intensity is measured at two or more wavelengths, the derivative of intensity can be approximated to first order as $$\frac{\partial I}{\partial \lambda} \approx \frac{\Delta I}{\Delta \lambda} = \frac{I_2 - I_1}{\lambda_2 - \lambda_1}. \quad (4)$$

Higher-order approximations for the derivative of intensity improve the precision of the technique. For phase-only objects, the result from Eq. (4) can be substituted into Eq. (3), which can be rewritten in terms of the Laplacian of the phase, $\nabla^2\phi$:

$$\nabla^2\varphi = \frac{2\pi}{Iz}\frac{\partial I}{\partial \lambda}, \quad (5)$$

which can be solved for the phase, $\phi$, using a Poisson solver, such as a fast Fourier transform (FFT) solver or a solver similar to those used in TIE imaging.

As the amount of defocus or change in wavelength increases, noise may decrease, but the validity of the first-order approximation in Eq. (4) may decrease, resulting in less precise wavefront measurements. To prevent this, preferred embodiments may measure the intensity at a plane in the small defocus limit, i.e., a plane characterized by a relatively small defocus z. Because defocus depends in part on the object being imaged, optimum measurements may be made when the Fresnel number, $N_F$, is sufficiently large, i.e., when $$N_F = \frac{a^2}{\lambda d} \geq 1, \quad (6)$$

where a is the characteristic radius of the object and d is the distance between the object plane and the measurement plane. Thus, objects and planes with Fresnel numbers greater than or equal to one are in the small defocus limit.

In imaging systems characterized by chromatic dispersion, different spectral components of the wavefront may come into focus at different depths. This can be used to advantage, as in the TIE approach, by measuring an in-focus image at a first wavelength (e.g., green), an under-focused image at a second wavelength (e.g., blue), and an over-focused image at third wavelength (e.g., red) in a single image plane. Ideally, the second and third wavelengths are offset from the first wavelength by equal amounts, though this is not necessary. The out-of-focus images are used to estimate the derivative of the intensity in the direction of propagation, which, in turn, can be used to solve for the phase. If the chromatic dispersion of the imaging system is a known quantity, then the phase measurement can be used to adjust the defocus at each wavelength propagating through the system.

The change in intensity with respect to wavelength can be measured by illuminating a phase object with white light and filtering transmitted or reflected intensity into different wavelength bins. The spectral width of each wavelength bin should be small to avoid violating the assumption that the transform operator is linear, and the optimal defocus distance is object-dependent. Alternatively, the intensity can be measured by illuminating an object at several discrete wavelengths (e.g., with two or more lasers or light-emitting diodes) and recording the transmitted or reflected intensity at each wavelength. Swept-wavelength sources, such as tunable diode lasers, can be used to make sequential measurements of intensity versus wavelength. (Colored phase objects may violate the "conservation of intensity" assumption that underlies the inventive technique. Such violations may be compensated for by a priori knowledge of the color information or spectral normalization.)

FIGS. 4A and 4B show intensity plots of waves propagating at wavelengths corresponding to blue and red light, respectively. The waves propagate in z from an aperture (not shown) on the left side of each plot to a plane of defocus on the right side of each plot. Diffraction fringes appear in the transverse dimension, x, as the waves propagate further from the apertures.

FIG. 4C shows the intensity, I, of each wave versus x at the plane of defocus. The intensity varies as a function of transverse position and of wavelength—although the intensity variation associated with each wave has the same character, the period is larger for the red wave than for the blue wave. Subtracting one fringe pattern from the other yields the plot shown in FIG. 4D, which is the Laplacian of the phase, $\nabla^2\phi$. Solving the Laplacian yields the phase variation of the incident wavefronts, which can be used to derive information about the shape of the aperture given a homogeneous propagation medium.

Bayer Filters and Direct Image Sensors for Color Intensity Measurements

Since the present inventive technique does not require strictly coherent illumination, color filters are suitable for splitting a color image into two or more wavelength images to be input into the measurement. For example, preferred embodiments may use standard Bayer filters, as disclosed in U.S. Pat. No. 3,971,065 to Bayer, incorporated herein by reference in its entirety, although other filters are suitable as well.

Figure 5A:
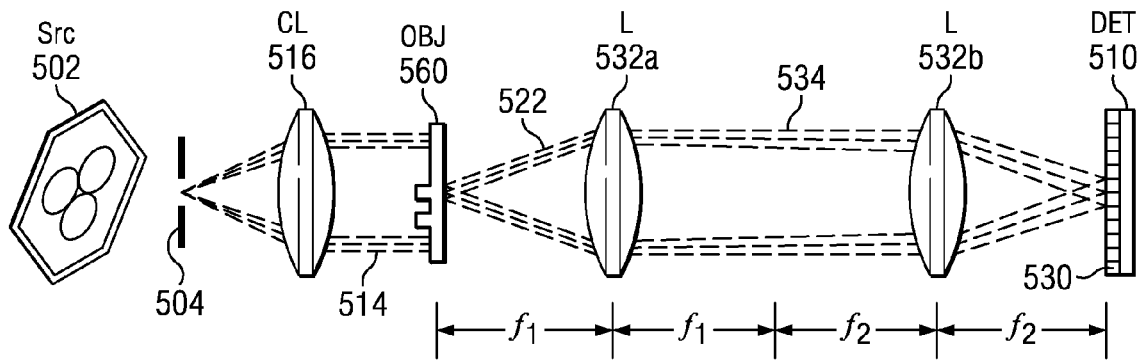
FIGS. 5A-5C are schematic diagrams of a sensing apparatus that can be used to estimate phase differences based on wavelength-dependent intensity measurements.
Figure 5B:
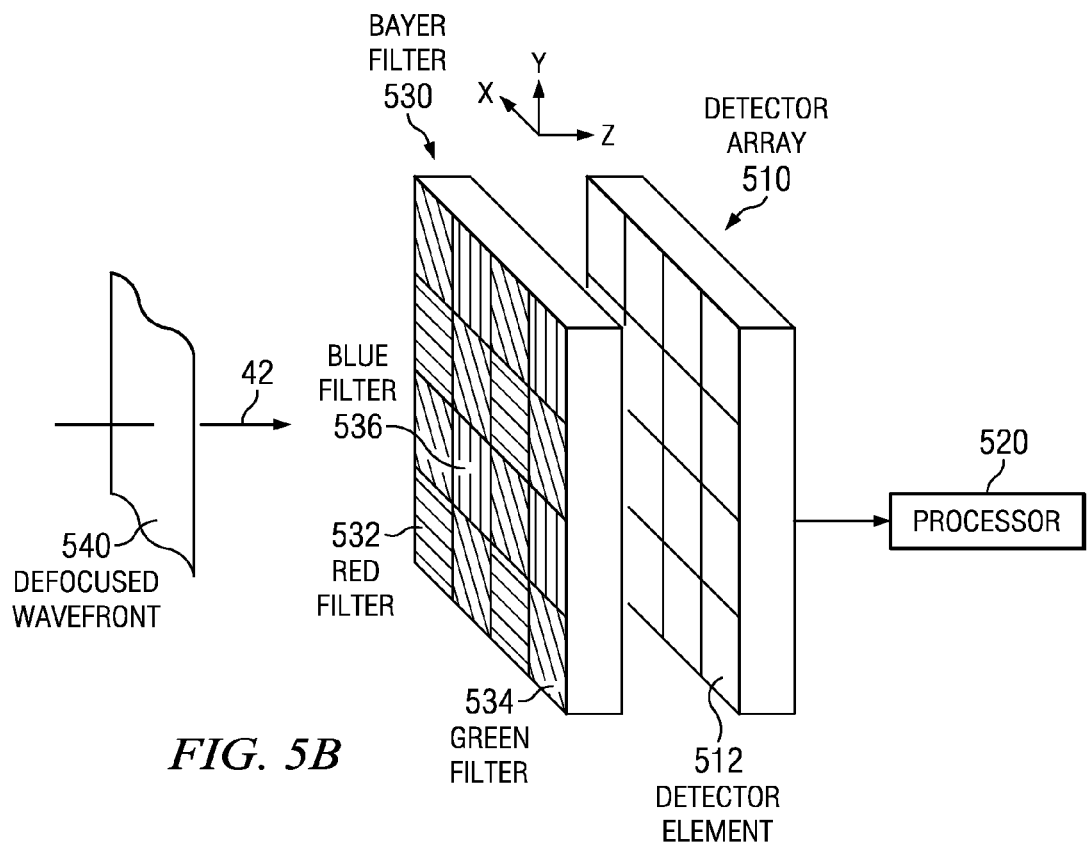
Figure 5C:
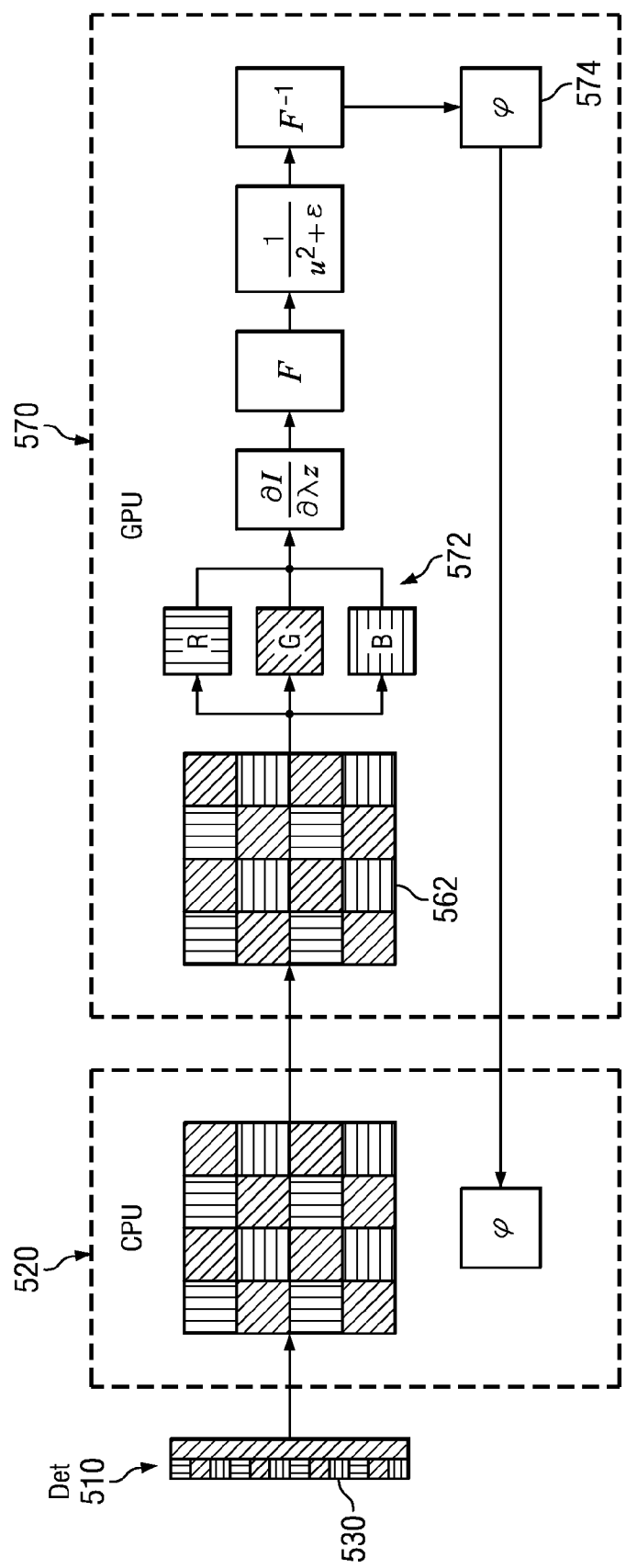

FIGS. 5A-5C show an apparatus that detects intensity of a defocused, broadband wavefront 540 as a function of wavelength and estimates phase differences associated with the wavefront 540. A source 502 emits broadband light, which is filtered with a pinhole 504 and collimated with a collimating lens 516 to produce a collimated beam 514. The collimated beam 514 illuminates a phase object 560 whose thickness and/or refractive index varies as a function of transverse position. Propagation through the phase object transforms the collimated beam 514 into a beam 534 with a distorted wavefront.

A 4F imaging system (lenses 532a and 532b) images the distorted wavefront of the beam 534 transmitted by the phase object 560 on a detector array 510 at normal incidence. Dispersion in the phase object 560 and the lenses 532a, 532b causes the different spectral components of the wavefront to come into focus at different depths. For example, imaging through an optical train with a net normal dispersion causes red, green, and blue light to come into focus at a far, intermediate, and near planes, respectively. A Bayer filter 530 (FIG. 5B) coupled to the detector array 510 filters the wavefront into red, green, and blue spectral bins with red, green, and blue filters 532, 534, and 536 coupled to respective detector elements 512 in the detector array 510.

Each detector element 512 senses light at one color (i.e., red, green, or blue) and emits a signal to a central processing unit (CPU) 520 that is operably coupled to the detector array 510. At a minimum, two measurements for each of two colors (i.e., measurements from four detector elements) can be used to estimate the phase difference along a corresponding line in the plane of the detector array 510. Additional measurements improve the precision of the estimate as described below.

The CPU 520 transfers color-coded intensity measurements 562 to a graphics processing unit (GPU) 570, which separates the intensity measurements 562 into different color channels 572. The GPU 570 calculates the derivative of intensity with respect to defocus, $\partial I/\partial\lambda z$, from the selected color channels 572; the GPU 570 then solves for the phase 574 of the defocused wavefront using a Fourier-domain solver. The GPU 570 transfers or copies the phase 574 to memory accessible by the CPU 520, which reports the phase to user and/or uses the phase 574 to calculate optical path lengths or profiles associated with the phase object 504. Alternate apparatus may use the CPU 520 instead of the (optional) GPU 570 to derive the phase.

Because the Bayer filter 530 has twice as many green filters 534 as red filters 532 or blue filters 536, the detector array 510 makes twice as many intensity measurements at green wavelengths as at red or blue wavelengths. The CPU 520 and GPU 570 can use these extra measurements to approximate the intensity derivative to second order:

$$\frac{\partial^2 I}{\partial \lambda^2} = \frac{I_R - 2I_G + I_B}{(\lambda_R - \lambda_G)(\lambda_G - \lambda_B)}, \quad (6)$$

where the subscript R, G, and B indicate red, green, and blue, respectively. Usually, making a higher-order approximation increases noise because doubling a measurement (e.g., $I_G$) results in a corresponding doubling of noise associated with that measurement. In this case, however, the detector makes two green measurements for every red and blue measurement, so there is no need to double $I_G$. As a result, the noise associated with $I_G$ does not double either.

Figure 6A:
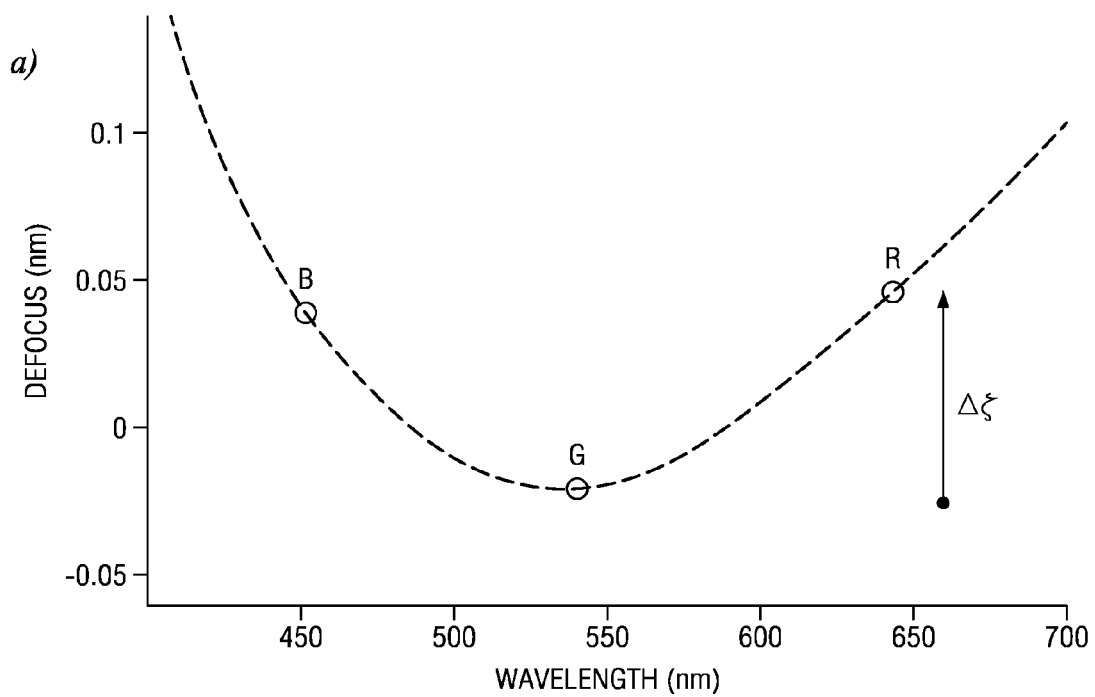
FIG. 6A is a plot of defocus versus wavelength for a red-blue achromatic lens.
Figure 6B:
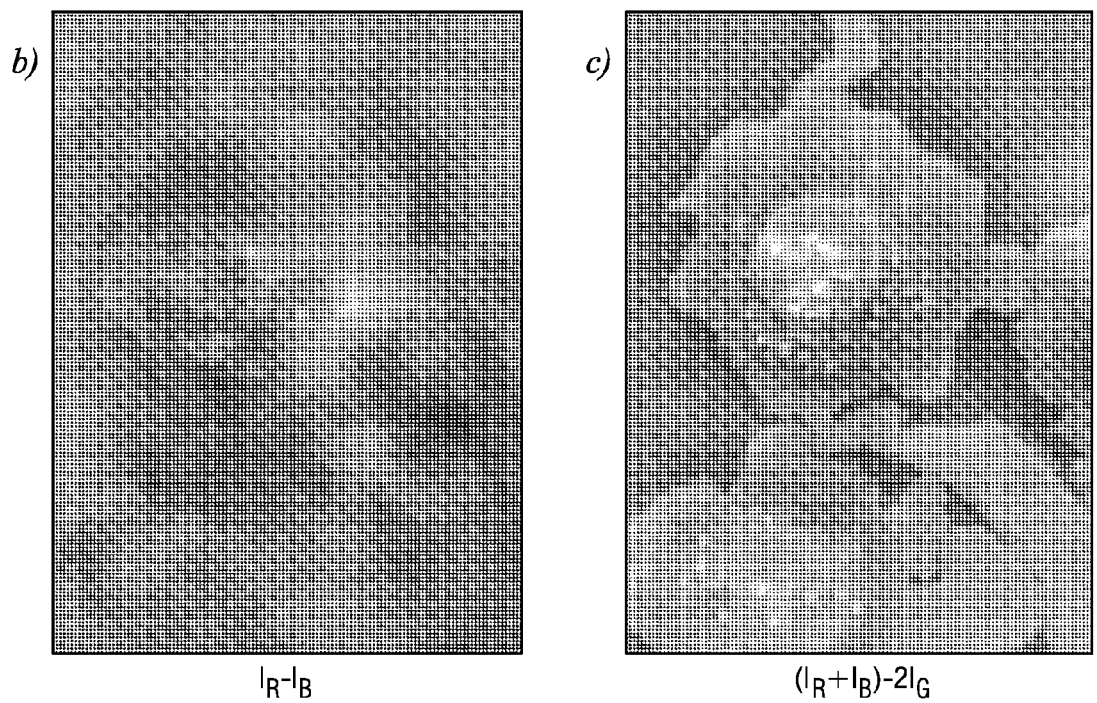
FIG. 6B shows plots of phase results for imaging with (right) and without (left) balanced noise performance enabled by achromatic lenses.

FIGS. 6A and 6B illustrate how to balance the noise in different color channels with Bayer filters and achromatic or apochromatic lenses, which are found in most microscope objectives. Achromatic and apochromatic lenses focus red and blue light (but not green light) to same focal plane as shown in FIG. 6A, which is a plot of defocus versus wavelength for a typical red-blue achromatic lens. For an achromat or apochromat, the derivative of the intensity with respect to defocus is:

$$\frac{\partial I}{\partial \xi} \approx \frac{(I_R + I_B) - 2I_G}{2\Delta \xi}, \qquad (7)$$

where $\Delta\xi = \Delta\lambda z$ is the amount of defocus between the green channel and the red and blue channels. (The derivative given in Eq. (7) can be used to compute the phase as described above.) Because achromats and apochromats focus red and blue light to the same plane, however, the detector makes one measurement in the red/blue focal plane for each measurement in the green focal plane. As described above, a Bayer filter yields two green measurements for each red/blue measurement pair, so using an achromat or apochromat with a Bayer filter yields an equal number of measurements in the green channel as in the red/blue channel. The noise in the green channel approximately balances the noise in the red/blue channel because there are an equal number of measurements in each channel. FIG. 6B shows the improvement in performance resulting from calculated the phase with Eq. (7) (right) compared to calculating the phase with a first-order red/blue intensity derivative (left).

Other embodiments may exploit chromatic dispersion, or "chromatic defocus," for obtaining phase information by changing the separation between focal planes associated different color channels. For example, the focal lengths and/or dispersion characteristics of lenses (e.g., lens 512, 532a, and 532b) and other elements in the optical path can be selected to increase or decrease the separation between channels to balance noise, as described above, or to increase the derivative calculated by the processor. Example apparatus may also include adjustable dispersion elements, such as spatial light modulators, liquid lenses, and prisms, for tuning the net dispersion of the optical train.

Alternative embodiments may use direct image sensors, such as those produced by Foveon®, instead of detector arrays coupled to filters. Unlike conventional detector arrays, direct image sensors filter colors using the wavelength-dependent penetration of photons in silicon. As a result, direct image sensors record image information at red, green, and blue wavelengths at each and every pixel, instead of recording color-coded intensity with only a fraction of the available pixels. See U.S. Pat. No. 5,965,875 to Merrill, incorporated herein by reference in its entirety, for more on direct image sensors.

Index Measurements

FIGS. 7A-7C show full-color images (top; reproduced here as grayscale images) and phase reconstructions (bottom) of various objects imaged with a brightfield transmission optical microscope with 20×/0.4 numerical aperture (NA) objective. The average illumination wavelength was about 532 nm for each image. FIG. 7A shows the height of an etched trench in poly(methyl methacrylate) (PMMA) with a depth 190 nm, a width of about 50 μm, and a refractive index of about 1.48. FIGS. 7B and 7C show live HMVEC cells and live HeLa cells, respectively. Solving for the variation in intensity of the color images (top row) with respect to wavelength, then calculating the phase difference yields the phase reconstructions in the bottom row.

Real-Time Phase Measurements for Adaptive Optical Systems

Phase variations can also be used to map aggregate optical densities or inhomogeneities. For example, measuring broadband light transmitted through a gas produces a phase measurement that varies as a function of the gas density integrated along the direction of propagation. As pressure or temperature variations cause the gas to expand or contract, the phase measurement varies accordingly. Because the intensity measurements are made at a single plane, they can be made quickly, and, because they can be solved using FFT solvers, the phase variation can be tracked in real time. Real-time phase measurements are especially useful for tracking changes in atmospheric density, which limits the quality and exposure time of images of stars, satellites, and other celestial bodies taken from Earth.

Figure 8:
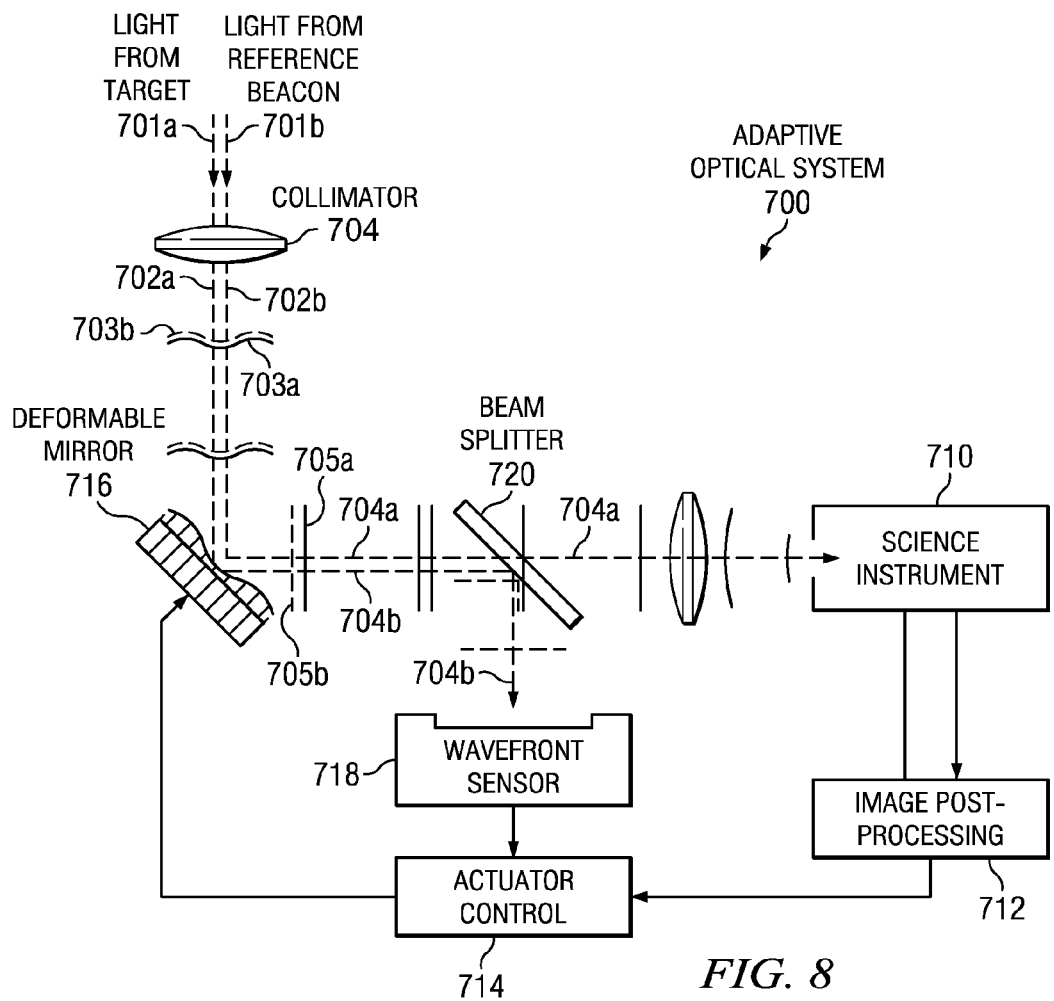
FIG. 8 is a schematic diagram of an adaptive optical system that measures and responds to phase differences by calculating changes in intensity with wavelength at a single plane.

FIG. 8 shows a block diagram of an adaptive optical system 700 that uses closed-loop feedback to adjust a deformable mirror 716 based on phase difference measurements made by a wavefront sensor 718. A lens 704 collimates light from target 701a, such as a star, to produce a collimated, uncorrected target beam 702a with a distorted or aberrated wavefront 703a. The uncorrected target beam 702a reflects off the deformable mirror 716, which cancels the distortion, to form a corrected target beam 704a with a corrected wavefront 705a. A scientific instrument 710, such as a telescope, detects the corrected target beam 704a and transmits a corresponding signal to an image postprocessor 712.

The lens 704 also collimates light from a reference beacon 701b to produce a collimated, uncorrected reference beam 702b with an aberrated wavefront 703b that matches the aberrated wavefront 703a of the uncorrected target beam 702a. The uncorrected reference beam 702b reflects off the deformable mirror 516 to form a corrected reference beam 704b with a corrected wavefront 705b. A beamsplitter 720 directs the reference beam 704b to a wavefront sensor 718, which measures wavefront error (phase differences) in the reference beam 704b using the techniques described above. Depending on the embodiment, the beamsplitter 720 may use polarization, wavelength, or any other suitable means to separate the reference beam 704b from the target beam 704a.

Changes in atmospheric conditions cause corresponding changes in the aberrated wavefronts 702a, 702b. As these changes become more severe, the wavefront sensor 718 detects phase differences in the corrected wavefront 704b. The sensor 718 transmits these measurements to an actuator controller 714, which, in turn, adjusts the deformable mirror 716 to compensate for the changes in atmospheric distortion.

Figure 9:
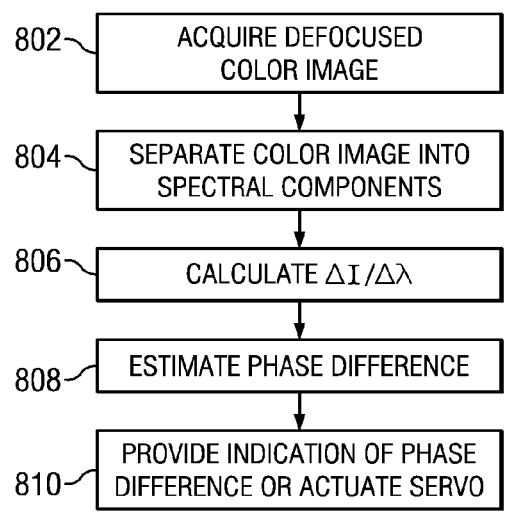
FIG. 9 is a flow diagram that illustrates how a computer program estimates phase using defocused color images.

FIG. 9 is a flow diagram that illustrate how the techniques described above can be implemented using software to manipulate data from microscopes and digital cameras. First, a defocused color image is acquired using the microscope or camera (802). Second, the color image is separated (if necessary) into its constituent color components, e.g., red, green, and blue intensity maps (804). Other color schemes (e.g., cyan, magenta, yellow) are also suitable. In addition, the input data can also include monochromatic images (or intensity maps) at different colors.

The single-color intensity maps are used to compute the change in intensity with respect to wavelength (806), which, in turn, is used to estimate phase differences associated with the defocused beam (808). Finally, an indication of the phase difference, such as a surface profile, object shape, or refractive index distribution, is presented to a user (810). Alternatively, the phase difference can be used to compute an optical path length difference for adjusting components in an adaptive optical system (810).

While this invention has been particularly shown and described with references to example embodiments thereof, it will be understood by those skilled in the art that various changes in form and details may be made therein without departing from the scope of the invention encompassed by the appended claims.

What is claimed is:

1. A method of estimating a phase difference associated with a defocused wavefront, the method comprising:
measuring intensity of the defocused wavefront at first and second wavelengths with a detector array;
calculating a change in the measured intensity as a function of wavelength; and
estimating the phase difference based on the change in the measured intensity.

2. A method as in claim 1, wherein measuring the defocused wavefront includes making intensity measurements at the first and second wavelengths in the same plane.

3. A method as in claim 1, wherein measuring the intensity at the first and second wavelengths occurs simultaneously.

4. A method as in claim 1, wherein measuring the intensity at the first and second wavelengths occurs sequentially.

5. A method as in claim 1, wherein the detector array is on a plane normal to the mean direction of propagation of the defocused wavefront.

6. A method as in claim 5, wherein the plane is characterized by a Fresnel number greater than or equal to one.

7. A method as in claim 1, further including:
measuring intensity of the defocused wavefront at a third wavelength with the detector array.

8. A method as in claim 7, wherein the first, second, and third wavelengths correspond to red, green, and blue light, respectively.

9. A method as in claim 1, further including:
filtering the defocused wavefront at the first and second wavelengths with a filter before measuring the intensity of the defocused wavefront.

10. A method as in claim 9, wherein the filter is a Bayer filter.

11. A method as in claim 10, wherein calculating a change in the measured intensity as a function of wavelength includes calculating the change with increased precision using filtered intensity measurements.

12. A method as in claim 1, wherein the detector array is a direct image sensor.

13. A method as in claim 1, further including:
directing the defocused wavefront through at least one lens towards the detector array.

14. A method as in claim 13, wherein the at least one lens includes an achromatic lens or an apochromatic lens.

15. A method as in claim 13, further including:
adjusting the at least one lens based on the phase difference.

16. A method as in claim 1, further including:
directing the defocused wavefront through an optical element with adjustable dispersion towards the detector array.

17. A method as in claim 1, wherein the defocused wavefront has partial spectral coherence and partial spatial coherence.

18. A method as in claim 1, further including:
illuminating an object with broadband light to produce the defocused wavefront.

19. A method as in claim 1, further including:
illuminating an object with light at the first and second wavelengths to produce the defocused wavefront.

20. A method as in claim 1, further comprising:
estimating an optical path length based on the estimate of the phase difference.

21. A method as in claim 15, further comprising:
adjusting the optical path length in response to the estimate of the optical path length.

22. A method as in claim 1, further comprising:
estimating a surface profile of an object from which the defocused wavefront was reflected based on the estimate of the phase difference.

23. A method as in claim 1, further comprising:
estimating a refractive index profile of an object through which the defocused wavefront was transmitted based on the estimate of the phase difference.

24. A method as in claim 1, further comprising:
adjusting an imaging system based on the estimate of the phase difference.

25. An apparatus for estimating phase associated with a defocused wavefront, the apparatus comprising:
a detector array configured to measure intensity of the defocused wavefront at first and second wavelengths; and
a processor operably coupled to the detector array, the processor configured to calculate a change in measured intensity as a function of wavelength and to estimate the phase based on the change in the measured intensity.

26. An apparatus as in claim 25, wherein the detector array is configured to measure intensity at the first and second wavelengths simultaneously.

27. An apparatus as in claim 25, wherein the detector array is configured to measure intensity at the first and second wavelengths sequentially.

28. An apparatus as in claim 25, wherein the detector array is configured to measure intensity at a third wavelength.

29. An apparatus as in claim 28, wherein the first, second, and third wavelengths correspond to red, green, and blue light, respectively.

30. An apparatus as in claim 25, wherein the detector array is a complementary metal-oxide-semiconductor array or charge-coupled device array.

31. An apparatus as in claim 25, further including:
a filter operably coupled to the detector array and configured to filter incident light into bands at the first and second wavelengths.

32. An apparatus as in claim 31, wherein the filter is a Bayer filter.

33. An apparatus as in claim 32, wherein the processor is further configured to calculate a change in measured intensity with increased precision using filtered intensity measurements.

34. An apparatus as in claim 25, wherein the detector array is a direct image sensor.

35. An apparatus as in claim 25, further including at least one lens configured to direct at least part of the defocused wavefront onto the detector.

36. An apparatus as in claim 35, wherein the at least one lens includes an achromatic lens or an apochromatic lens.

37. An apparatus as in claim 25, further including:
a broadband light source configured to produce the defocused wavefront by illuminating an object.

38. An apparatus as in claim 25, further including:
a light source configured to produce the defocused wavefront by illuminating an object at the first and second wavelengths.

39. An apparatus as in claim 25 in combination with at least one of a feedback loop, an adaptive optical system, an imaging system, and a brightfield transmission microscope.

40. A computer program product including a non-transitory computer-readable medium having stored thereon a computer-readable program, wherein the non-transitory computer-readable program, when executed by a processor, causes the processor to:
- accept data corresponding to measurements of intensity of a defocused wavefront at first and second wavelengths;
- calculate a change in the measured intensity as a function of wavelength;
- estimate a phase difference associated with the defocused wavefront based on the change in the measured intensity; and
- provide an indication of the phase to a user or cause an actuator to adjust an optical path length in response to the phase difference.

* * * * *